(12) United States Patent
Razzell

(10) Patent No.: US 6,954,486 B2
(45) Date of Patent: Oct. 11, 2005

(54) EARLY-LATE DETECTION

(75) Inventor: Charles John Henderson Razzell, Pleasanton, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 972 days.

(21) Appl. No.: 09/727,113

(22) Filed: Nov. 29, 2000

(65) Prior Publication Data

US 2002/0044592 A1 Apr. 18, 2002

Related U.S. Application Data

(63) Continuation-in-part of application No. 09/649,672, filed on Aug. 28, 2000.

(51) Int. Cl.[7] .......................... H04B 1/69; H04B 1/707; H04B 1/713
(52) U.S. Cl. .................. 375/148; 375/140; 375/240.27; 375/147
(58) Field of Search ................................ 375/148, 140, 375/240.27, 147

(56) References Cited

U.S. PATENT DOCUMENTS 4,606,051 A * 8/1986 Crabtree et al. ............ 375/332

FOREIGN PATENT DOCUMENTS

WO 9935763 7/1999

* cited by examiner

Primary Examiner—Mohammed Ghayour
Assistant Examiner—Juan Alberto Torres

(57) ABSTRACT

A rake receiver tracks a multi-path signal transmitted from a base station to a mobile station. The rake receiver comprises rake fingers each assigned to a multi-path component. Typically a rake finger performs an early late detection using early and late component of the energy of the component taken before and after a presumed occurrence of an optimum of the energy. An early-late signal is generated from a comparison between a product of a first integer and the early component and a product of another integer and the late component.

4 Claims, 3 Drawing Sheets

EARLY-LATE DETECTION

CROSS-REFERENCES TO RELATED APPLICATIONS

This is a continuation-in-part of application Ser. No. 09/649672 filed Aug. 28, 2000 entitled "Tracking of a multi-path resolved signal in a rake receiver", incorporated herein by reference.

FIELD OF THE INVENTION

The invention relates to a method for tracking a resolved signal. The invention also relates to a rake receiver for tracking a resolved signal. The invention then concerns a computer readable medium for storing instructions for carrying out a method of the invention.

The invention is relevant to communications over a cellular network using Code-Division Multiple Access technology for tracking delays of multipath signals from a base station to a mobile station. The invention may also be applied in a rake receiver in a mobile communication device for resolving and tracking arriving delays of multi-path components of a transmitted signal.

BACKGROUND ART

Various multiple-access technologies may be used for cellular communications.

A first group of these technologies consists in narrowband channelized technologies such as the Frequency-Division Multiple Access (FDMA) technology and the Time-Division Multiple Access (TDMA) technology. In a FDMA communication system each user is assigned to a first specific frequency sub-band of the bandwidth reserved for up-link communications (from a mobile station to a base station) and to a second frequency sub-band of the bandwidth reserved for down-link communications (from a base station to a mobile station). In a TDMA system each user is assigned to a different time slot and accesses the entire reserved sub-bands.

A second group of multiple-access communication technologies consists in wideband channelized technologies. Among these, the Code-Division Multiple Access (CDMA) technology has been widely adopted as a standard. CDMA allows each user to use the entire bandwidth for the complete duration of a call.

CDMA is a spread spectrum technology which means that the information contained in the information signal is spread over a much greater bandwidth than that of the original signal. In the Direct Sequence Spread Spectrum (DS-SS) technology, the information signal of data rate Tb is multiplied in the transmitter by a pseudo-random binary sequence, the code sequence, of clock period T, so-called the chip period, where Tb>>T. This has the effect of increasing the bandwidth of the signal by the ratio Tb/T. The spread signal is then transmitted over the wider band with a reduced power spectral density relative to a corresponding de-spread signal. The code sequence is independent of the information signal and is known to the transmitter and the receiver.

At the receiver, the received wide-band spread spectrum signal must be de-spread in order for the information signal to be recovered. De-spreading is achieved by multiplying the spread signal by an exact replica of the code sequence used in the transmitter. The replica must be synchronized with the received spread signal. A local code sequence generator that generates the code sequence at the receiver must be aligned and synchronized within one chip of the received spread signal.

Code synchronization may be performed in two stages: a code acquisition followed by a fine code tracking. Acquisition reduces the alignment timing offset between the received spread signal and the locally generated code sequence to less than a chip period. Tracking aligns and maintains the two signals synchronized.

In a real communication environment such as urban and suburban areas, radio signals are reflected and scattered off various objects along the transmission path between the transmitter and the receiver. Therefore the spread signal, mentioned above, encounters multipath when transmitted from the base station to the mobile station. In addition, phase cancellation of signals following different paths may cause severe fading and may lower the received signal power. However CDMA provides robust operation in fading environments. CDMA takes advantage of multipath fading to enhance communication and voice quality. For this purpose, a rake receiver is present in each mobile station and allows selecting the strongest multipath signals incoming from the base station. Transmission delays are estimated for the strongest multi-paths and the estimated delays are assigned to specific "fingers" of the rake receiver. A finger is a processing element that correlates the received spread signal with the replica of the locally generated code sequence on the basis of the estimated time delay assigned to the finger. The fingers' outputs are then weighted and then coherently combined to produce an enhanced signal. Thus, the multi-path nature of the channel is used to create a diversity advantage in CDMA.

International application WO 99/35763 discloses a method for estimating multipath delays of a direct spread spectrum signal transmitted in fading environments. Delays are estimated by measuring the envelope of the signal.

SUMMARY OF THE INVENTION

It is an object of the invention to provide a rake receiver comprising rake fingers performing low computational early-late detection to track multi-path components of a signal transmitted in a fading environment.

To this end, a method of the invention comprises:

determining a first value representative of an energy of the signal at a first instant before a presumed occurrence of a local optimum of the energy of the signal;

determining a second value representative of the energy at a second instant after the presumed occurrence of the local optimum;

calculating a first product of a first positive integer and the first value and calculating a second product of a second positive integer and the second value, with the first positive integer smaller than the second positive integer;

generating a first logical value from a comparison 25 between the first and the second products;

calculating a third product from a third positive integer and the first value and calculating a fourth product from a fourth positive integer and the second value, with the third positive integer smaller than the fourth positive integer;

generating a second logical value from a comparison between the third and the fourth products; and, generating a detector output signal from a difference between the first logical value and the second logical value.

A method of the invention allows tracking a signal using the first and second values of the energy without necessarily determining a metric involving a ratio of these two values that may be complicated to calculate and costly in terms of hardware. Such a method of tracking the signal does not require normalization of the first and second values of the energy of the signal. An advantage of one or more embodiments of the invention is to provide simple and efficient tracking.

BRIEF DESCRIPTION OF THE DRAWINGS

The invention is explained in further detail, by way of example, and with reference to the accompanying drawing wherein:

Elements within the drawing having similar or corresponding features are identified by like reference numerals.
Preferred Embodiment FIG. 1 is a communication system 100 of the invention comprising a first transceiver 200 communicating with at least a second transceiver 300. The transceiver 200 may be a base station and the transceiver 300 may be a mobile station such as a handset or a cell phone in a CDMA cellular communication system. The transceivers 200 and 300 comprise respective transmitters T200, T300 for transmitting information signals and comprise respective receivers R200, R300 for receiving information signals. The transmitter T200 transmits via an antenna 210 an information signal S spread by correlation with a pseudo-random noise code sequence. The signal S was also previously modulated by correlation with a carrier signal of carrier frequency fc. The spread signal S is received by an antenna 310 of the transceiver 300.

While transmitted from the transmitter T200 to the receiver R300, the signal S encounters multipath. In this embodiment, the signal S is reflected and scattered off a mountain 110 and a building 120. The spread signal S is the superposition of at least two multipath signals S1 and S2. The multipath signals S1 and S2 have different transmission paths and different transmission delays. The path attenuation and phase shift to which the signals S1 and S2 are subjected are assumed to be random-like and mutually independent. As a result the signal S can be thought as the superposition of a number of randomly attenuated and phase rotated signals containing among others the signals S1 and S2.

Figure 1:
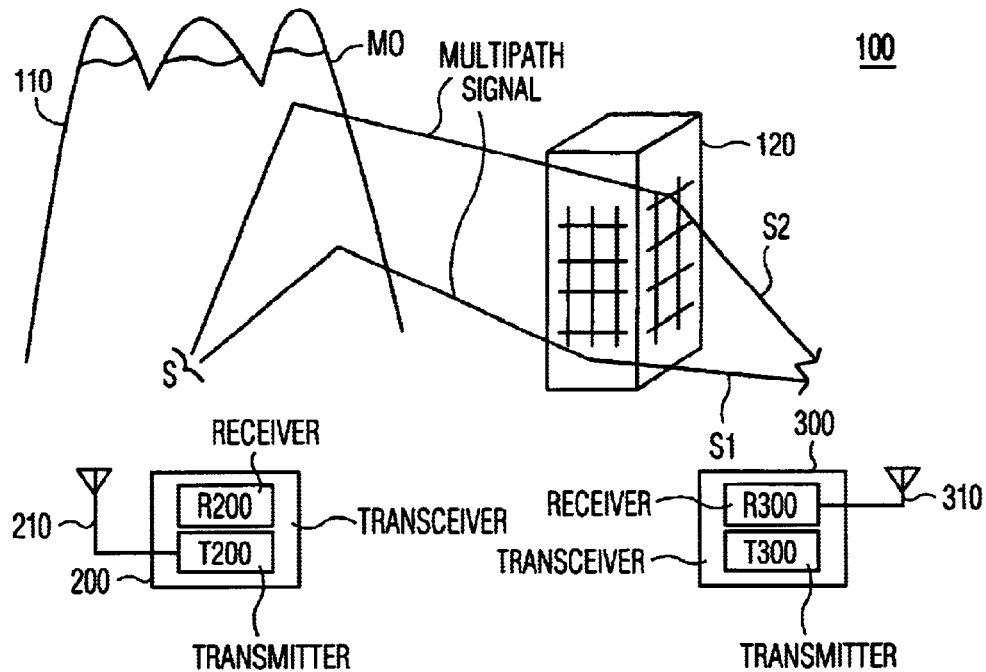
FIG. 1 is a conventional communication system.
Figure 2:
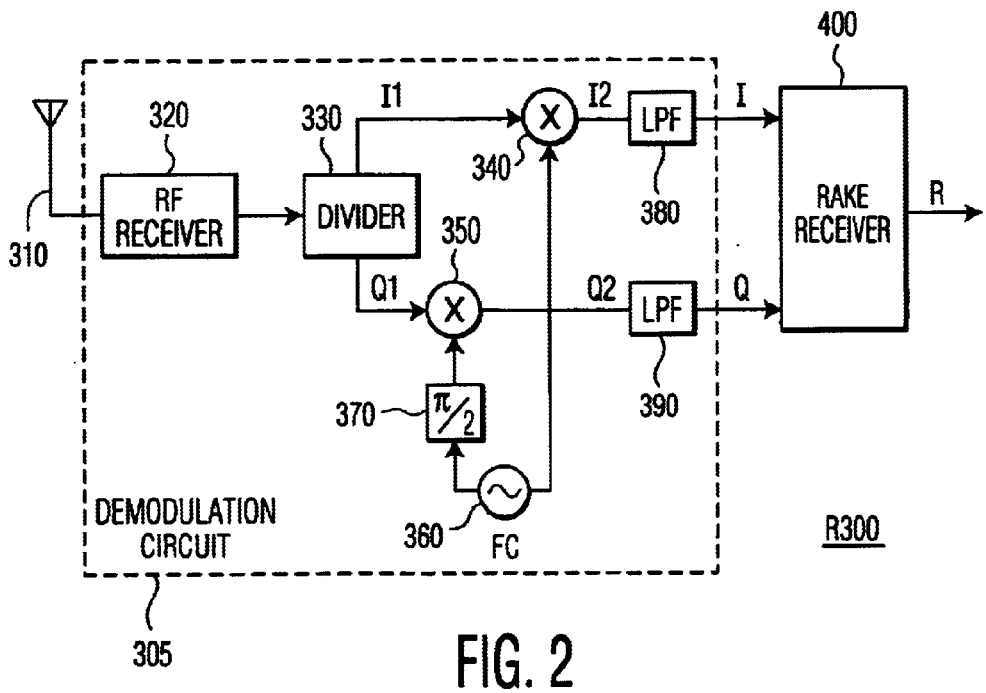
FIG. 2 is a block diagram of a conventional receiver.

FIG. 2 is a conventional block diagram of the receiver R300. The signal S transmitted from the base station 200 is received by the antenna 310 and inputted to a demodulation circuit 305 of the receiver R300. The signal S is passed through a RF receiver 320 and thereafter processed by a divider 330 for division into two radio signals I1 and Q1. The radio signal I1 is mixed in a mixer 340 with the oscillator output fc of an oscillator 360 resulting in an in-phase demodulated base-band signal I2. The radio signal Q1 is mixed in a mixer 350 with the oscillator output fc shifted to $\pi/2$ in a phase shifter 370 resulting in a quadrature demodulated base-band signal Q2. The base-band signals I2 and Q2 are then respectively passed through low pass filters 380 and 390 for providing channel selectivity. Both filtered signals I and Q are then provided to a rake receiver 400 for multi-path components resolving and diversity combining into a signal R.

Figure 3:
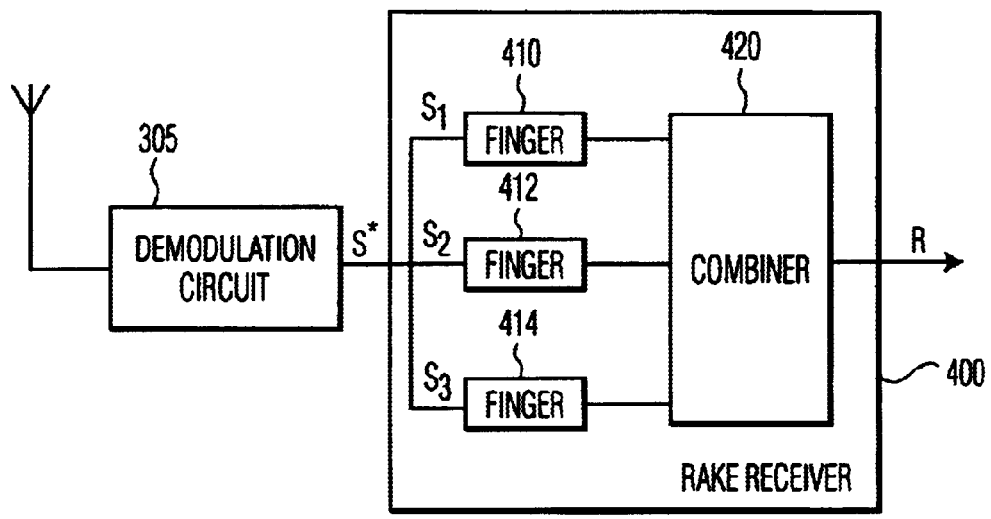
FIG. 3 is a block diagram of a conventional receiver.

FIG. 3 is another block diagram of the receiver R300. The receiver R300 comprises the demodulation circuit 305 for extracting the in—phase and quadrature components I and Q further transmitted as a complex signal S* to the rake receiver 400. The rake receiver 400 comprises three rake fingers 410, 412, and 414. Each finger 410, 412, and 414 is assigned a multi-path component S1, S2 and S3, respectively, of the received signal S for acquisition and tracking. The rake receiver 400 also comprises a maximal ratio combiner 420 for combining the multi-path components S1–S3 resolved by the fingers 410, 412, and 414 to provide diversity. The resulting signal is the signal R.

Figure 4:
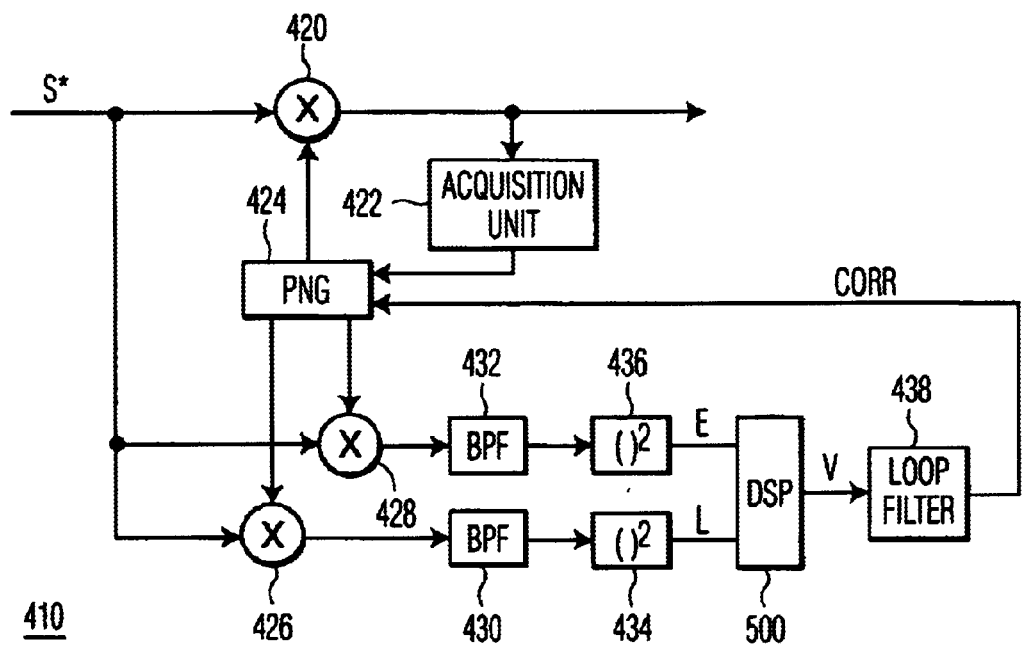
FIG. 4 is a rake finger of a receiver of the invention.

FIG. 4 is a circuit block diagram representing one example of a structure of the rake finger 410, 412, and 414 of the invention. Initially the rake finger 410, 412, and 414 adopts an acquisition mode. Acquisition is performed in the acquisition unit 422 for synchronizing a replica of the code sequence, originally used to spread the information signal, with the multi-path component S1–S3 assigned to the finger 410, 412, and 414. The replica of the code sequence is generated in a pseudo-noise generator 424.

Thereafter, in a tracking mode, the rake finger 410, 412, and 414 maintains the generated code sequence aligned to the assigned multi-path component S1–S3. The base-band signals I and Q are provided as the complex input signal S* to the rake finger 410, 412, and 414. The signal S* is then branched in two branches for determining early and late components E and L representing respective early and late reception of the assigned signal component S1–S3 with respect to a presumed reception of the signal S1–S3 which is represented by a peak of the energy of the assigned signal S1–S3.

Figure 6:
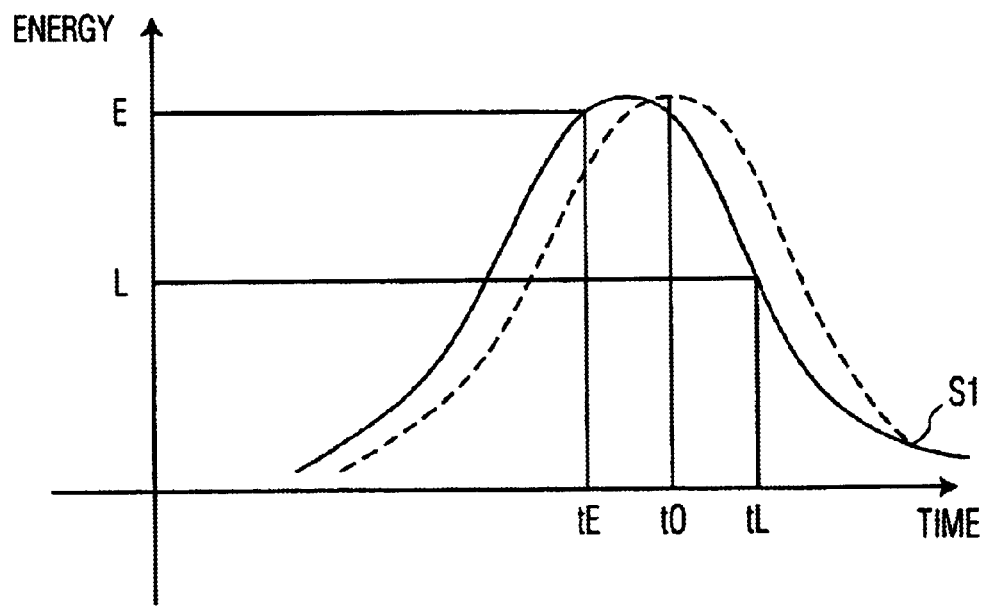
FIG. 6 is a diagram of the energy of a multipath component.

In a first branch, the early component E is determined by correlating in a mixer 428 the signal S* with the code sequence taken at a first instant tE (see FIG. 6) before the presumed peak of the energy of the signal S1–S3. The early component E is then determined by processing the output signal of the mixer 428 in a low-pass filter 432 and by complex magnitude squaring in a squared arrangement 436. As shown in FIG. 6, a presumed peak of the energy of the assigned signal S1–S3, represented in dashed line, is expected to occur at instant t0. The component E is representative of the energy of the signal S1–S3 taken at the first instant tE before the presumed occurrence at t0 of the optimum of the energy of the signal S1–S3.

Symmetrically, the late component L is derived by first correlating in a mixer 426 the signal S* with the code sequence taken at a second instant tL after the presumed occurrence of the maximum. The late component L is then determined by processing the output signal of the mixer 426 in the low-pass filter 430 and by complex magnitude squaring in a squaring arrangement 434. The component L is representative of the energy of the signal S1–S3 taken at the second instant tL after the presumed occurrence at t0 of the optimum of the energy of the signal S1–S3.

The early and late components E and L are then inputted to a delay detector 500 that processes the two components E and L and determines the early-late state of the reception of the assigned multi-path component S1–S3 indicated by an early-late signal V. In this embodiment the delay detector 500 is a digital signal processing (DSP) unit. The signal V is then provided to a loop filter 438 where an appropriate correction signal CORR is derived and transmitted to the pseudo-noise generator 424. The correction signal CORR allows monitoring the phase of the code sequence so that the code sequence is kept synchronized with the assigned component S1–S3.

An information signal is then obtained from the multi-path signal S1–S3 at the output of a mixer 420. The mixer 420 allows de-spreading the assigned component S1–S3 of the signal S* by correlating the signal S* with the code sequence aligned to the multi-path signal S1–S3.

Figure 5:
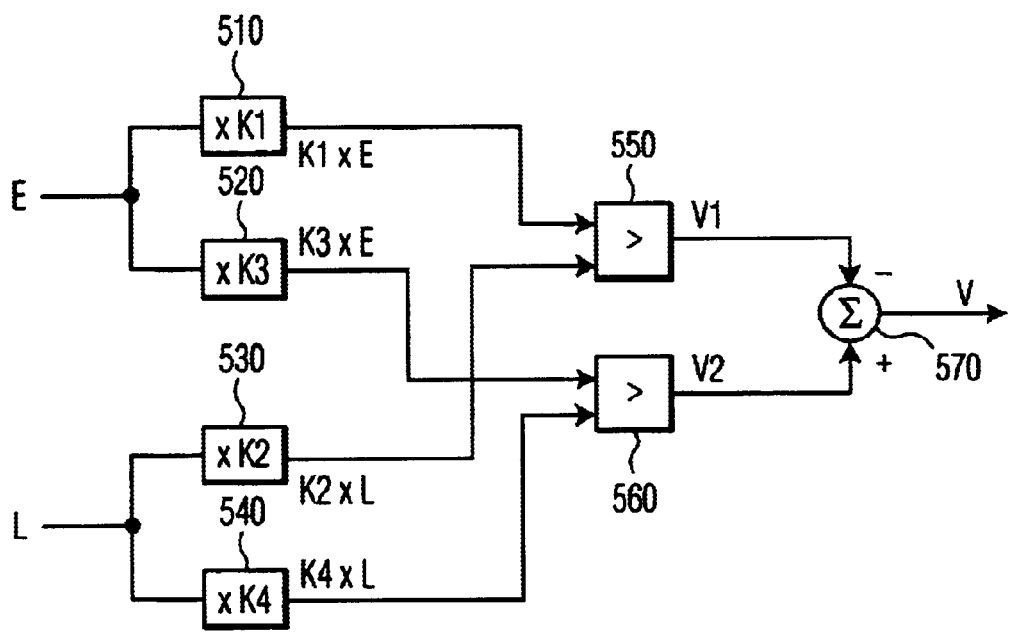
FIG. 5 is a delay detector of the invention.

A detailed embodiment of the detector 500 is given in FIG. 5. The detector 500 comprises a calculating unit 510, a calculating unit 530 and a logical comparator 550 for providing a logical signal V1. The signal V1 is obtained from a comparison of a first product K1*E of the early value E and a positive integer K1 derived in the unit 510 with a second product K2*L of the late value L and a positive integer K2 derived in the unit 530. In this embodiment K1 is smaller than K2 (K2/K1>1). V1 is 1 when K2*L>K1*E is true as shown in Table 1, V1 is 0 otherwise. V1=0 indicates that E/L>K2/K1>1, i.e. the tracking of the assigned component S1–S3 is early.

The detector 500 further comprises a calculating unit 520, a calculating unit 540 and a logical comparator 560 for providing a logical signal V2. The signal V2 is obtained from a comparison of a first product K3*E of the early value E and a positive integer K3 derived in the unit 520 with a second product K4*L of the late value L and a positive integer K4 derived in the unit 540. In this embodiment K3 is smaller than K4 (K3/K4<1). V2 is 1 when K4*L>K3*E is true as shown in Table 1, V2 is 0 otherwise. V2=0 indicates that E/L<K3/K4<1, i.e. the tracking of the assigned component S1–S3 is late.

The units 510, 520, 530, and 540 may be implemented as logic gates in the form of ICs or alternatively the functions carried out by the units 510, 520, 530, and 540 may be fulfilled by means of instructions in a software component.

The signals V1 and V2 are combined in an adder 570. The adder 570 allows calculating the value of the signal V of the expression V1–V2. The value of the signal V is given in Table 1 depending on the position of E/L with respect to the values K3/K4 and K2/K1.

TABLE 1

|  | E/L < K3/K4 < 1 | K3/K4 < E/L < K2/K1 | E/L > K2/K1 > 1 |
| --- | --- | --- | --- |
| V1 | 1 | 1 | 0 |
| V2 | 0 | 1 | 1 |
| V  | 1 | 0 | -1 |

V = 1 indicates that the tracking of the assigned component S1–S3 is late.
V = 0 indicates that tracking of the assigned component is quite on-time.
V = −1 indicates that tracking of the assigned component is early or in advance.

V=1 indicates that the tracking of the assigned component S1–S3 is late. V=0 indicates that tracking of the assigned component is quite on-time. V=~1 indicates that tracking of the assigned component is early or in advance.

K1, K2, K3 and K4 may be arbitrarily chosen with K1<K2 and K3<K4. K1 and K3 may be chosen such that K1=K3 and K2 and K4 may be chosen such that K2=K4. For example, K1=K3=2 and K2=K4=3 allow a simple implementation of the units 510, 520, 530, and 540 using a limited number of logic gates. The positive integers K1, K2, K3 and K4 may be fixed to different constants depending on the sensitivity required for the early-late detection. The values for K1=K3 and K2=K4 may be chosen greater to reduce the on-time zone and to permit sensitive phase control of the code sequence generator 424.

It is to be noted that, with respect to the described method and communication system, modifications or improvements may be proposed without departing from the scope of the invention. For instance, it is clear that this method may be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A method of tracking a resolved signal, the method comprising:
    determining a first value representative of an energy of the signal at a first instant before a presumed occurrence of a local optimum of the energy of the signal; determining a second value representative of the energy at a second instant after the presumed occurrence of the local optimum;
    calculating a first product of a first positive integer and the first value and calculating a second product of a second positive integer and the second value, with the first positive integer smaller than the second positive integer;
    generating a first logical value from a comparison between the first and the second products;
    calculating a third product from a third positive integer and the first value and calculating a fourth product from a fourth positive integer and the second value, with the third positive integer smaller than the fourth positive integer;
    generating a second logical value from a comparison between the third and the fourth products; and,
    generating a detector output signal from a difference between the first logical value and the second logical value.

2. The method of claim 1, wherein the first and the second instants are symmetrical in relation to the presumed occurrence of the optimum.

3. A rake receiver comprising:
    a rake finger to perform an early-late detection on a signal, the rake finger comprising:
        a first energy estimator determining a first value of an energy of the signal at a first instant before a presumed occurrence of a local optimum of the energy of the signal;
        a second energy estimator determining a second value of the energy at a second instant after the presumed occurrence of the optimum;
        a calculating arrangement calculating:
            a first product of a first positive integer and the first value,
            a second product of a second positive integer and the second value, with the first positive integer smaller than the second positive integer,
            a third product of a third positive integer and the first value,
            a fourth product of a fourth positive integer and the second value, with the third positive integer smaller than the fourth positive integer;
        a logical comparator determining a first logical value from a comparison between the first and the second products and determining a second logical value from a comparison between the third and the fourth products; and an early-late detector generating a detector output signal from a difference between the first and second logical values received from the comparator.

4. A computer readable medium for storing instructions to carry out a method comprising:

determining a first value representative of an energy of the signal at a first instant before a presumed occurrence of a local optimum of the energy of the signal;

determining a second value representative of the energy at a second instant after the presumed occurrence of the local optimum;

calculating a first product of a first positive integer and the first value and calculating a second product of a second positive integer and the second value, with the first positive integer smaller than the second positive integer; and generating a first detector output signal from a comparison between the first and the second products.

* * * * *